United States Patent [19]

Kranjec et al.

[11] Patent Number: 5,334,810
[45] Date of Patent: Aug. 2, 1994

[54] COMBINATION LOCK AND SWITCH MOUNT

[76] Inventors: John S. Kranjec; Robert S. Kranjec, both of 35 Hartford Trail, Brampton, Ontario, Canada, L6W 4K2

[21] Appl. No.: 892,761

[22] Filed: Jun. 3, 1992

[30] Foreign Application Priority Data

Jun. 3, 1991 [CA] Canada .................. 2043750

[51] Int. Cl.⁵ .............................................. H01H 9/02
[52] U.S. Cl. .................. 200/294; 200/43.01; 200/317; 200/330
[58] Field of Search .............. 200/43.01, 43.11, 43.16, 200/294, 295, 296, 331, 310, 317, 345, 344, 330, 332.1, 573, 574; 361/346, 347, 516, 417, 419, 420; 248/27.1, 27.3

[56] References Cited

U.S. PATENT DOCUMENTS

| | | | |
|---|---|---|---|
| 3,415,472 | 12/1968 | Vodinh | 248/27.3 |
| 4,255,780 | 3/1981 | Sakellaris | 200/310 X |
| 4,262,181 | 4/1981 | Tufano et al. | 248/27.1 X |
| 4,480,163 | 10/1984 | Morris et al. | 200/331 |
| 4,892,987 | 1/1990 | Aframian | 248/27.1 X |
| 4,931,600 | 6/1990 | Braun | 200/43.11 X |
| 4,937,407 | 6/1990 | Osika | 200/339 |
| 5,077,454 | 12/1991 | Lorenzo | 200/296 X |
| 5,193,664 | 3/1993 | Ives | 200/43.11 X |

Primary Examiner—Glenn J. Barrett
Attorney, Agent, or Firm—Barry R. Lipsitz

[57] ABSTRACT

A one piece mount for mounting switches is disclosed. The mount includes a face plate provided with an aperture in which a push button switch or a key operated switch may be located. A support bracket is located on the rear face of the face plate being formed as one piece with the plate and is provided with holes in which push button switches may be mounted. In one version of the mount a raised portion is provided on the rear face being formed as one piece with the face plate and the support bracket wherein the aperture extends through the raised portion. In use, this version of the mount is provided with a key operated lock cylinder mounted in the aperture and having a cam arm pivotally mounted on the rear face of the lock cylinder. At least one push button switch may be mounted in the support bracket with the relative positioning of the aperture and the support bracket being such that when the key is moved, the cam arm, which moves with the key, activates the push button switch mounted in the support bracket. In another version of the mount there is provided a bracket for mounting the mount on the edge of a recess in a wall, the bracket located adjacent one end of the face plate on the rear face. A key activated locking bar also for engaging the edge of a recess in a wall for locking the mount into the door or wall is located at the other end of the plate.

19 Claims, 5 Drawing Sheets

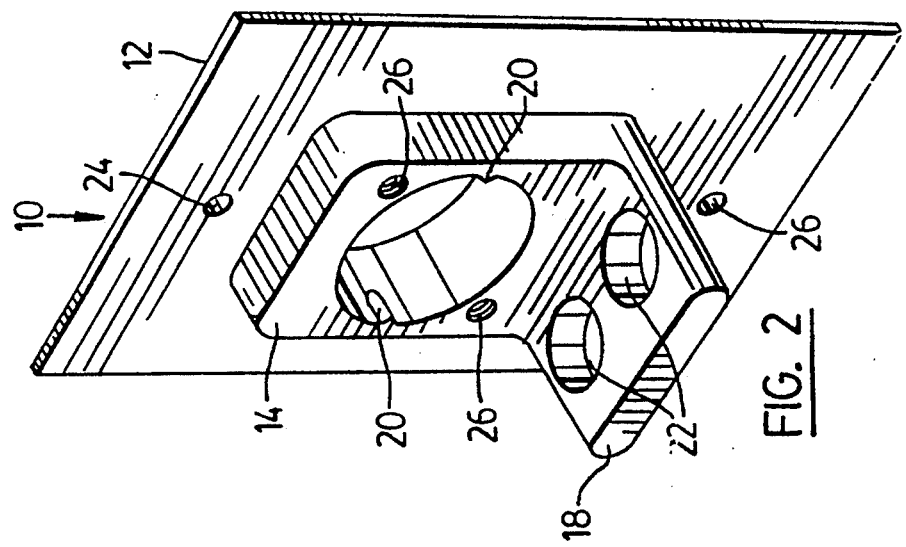
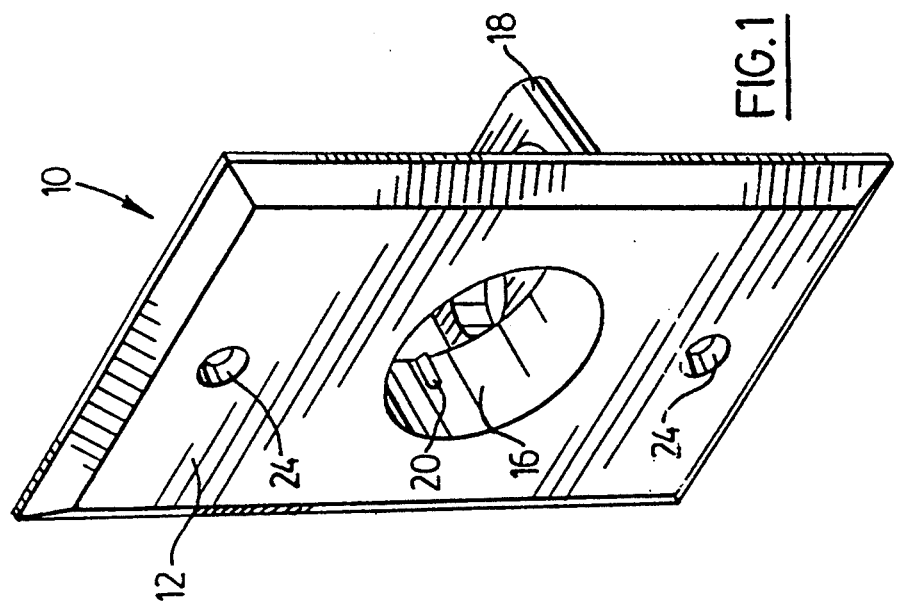

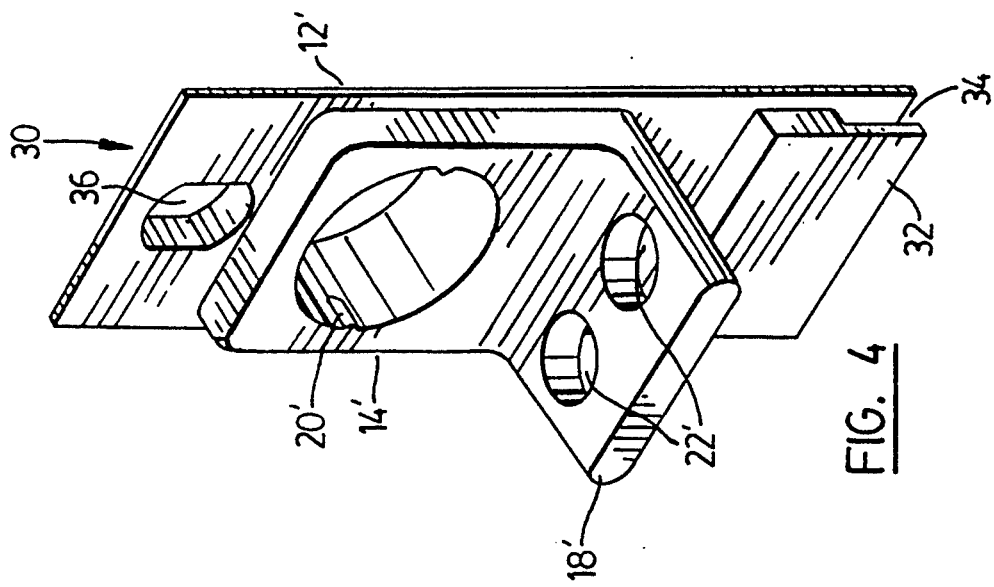
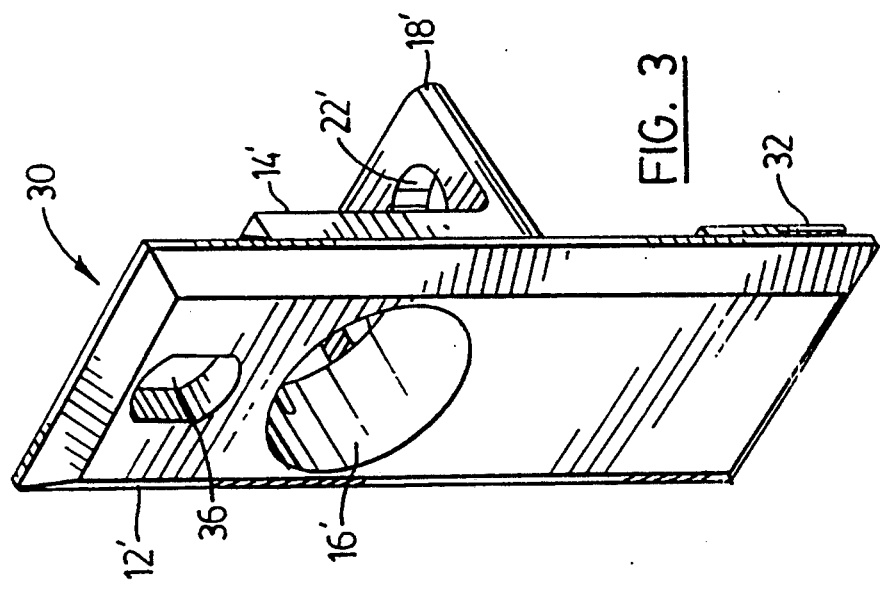

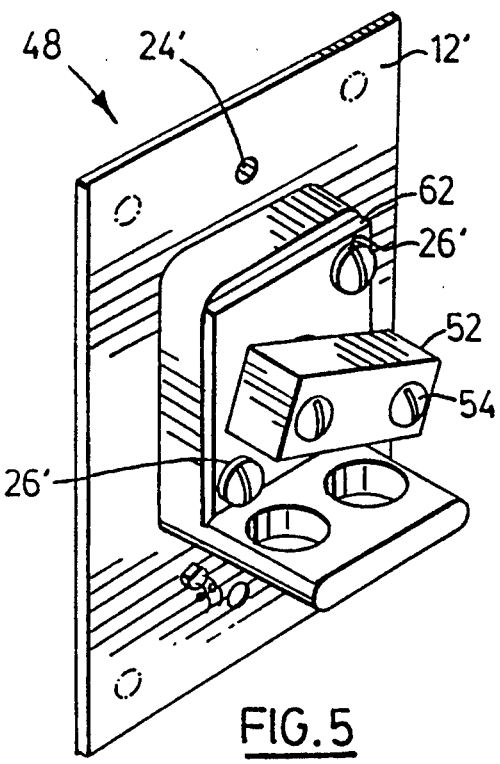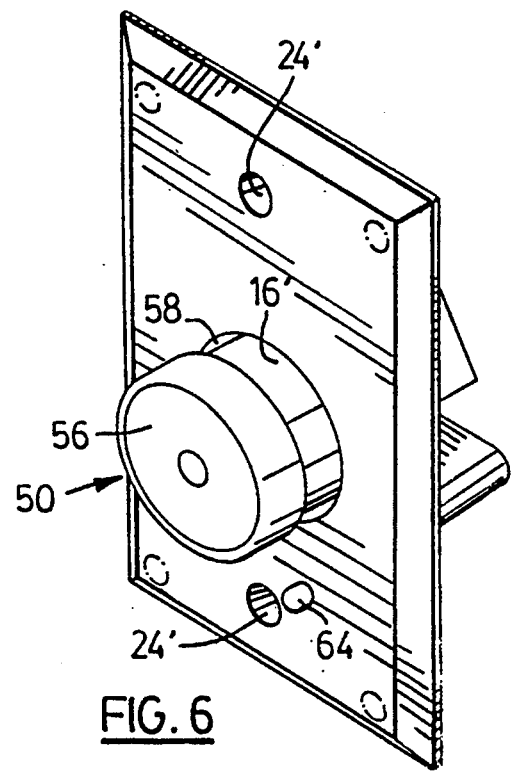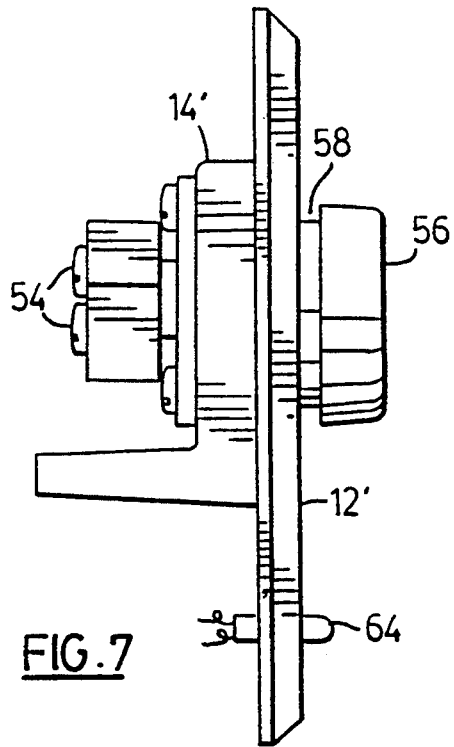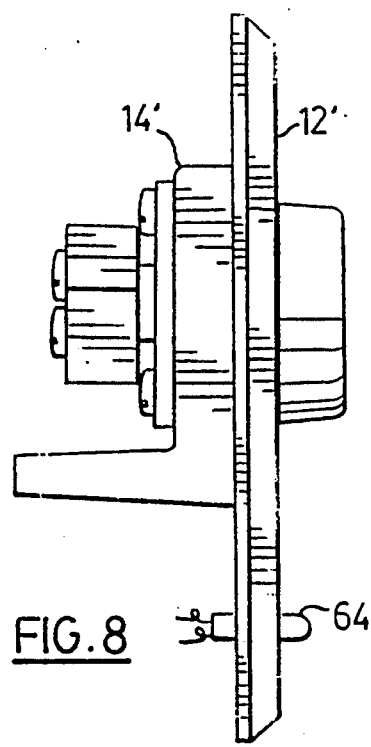

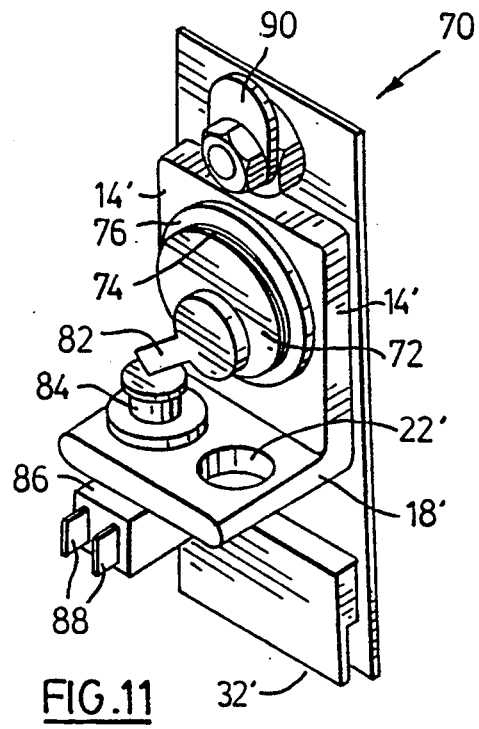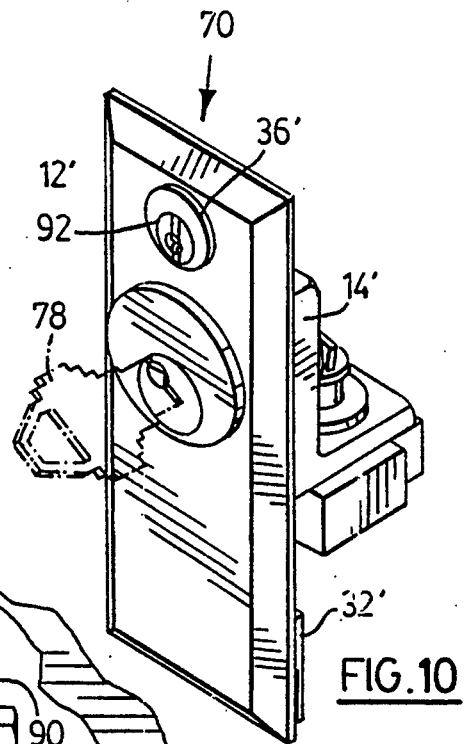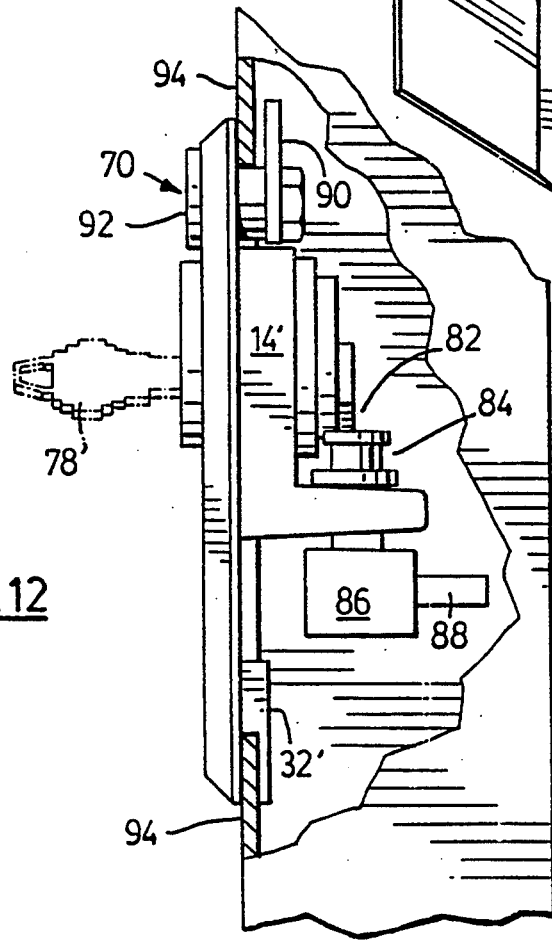

COMBINATION LOCK AND SWITCH MOUNT

BACKGROUND OF THE INVENTION

1. Field of the Invention

The present invention relates generally to mounts for switches and locks.

2. Description of the Related Art

Mounting units for mounting electrical switches and the like on doors or walls generally employ several different custom shaped components. The assembly of such mounts may be time consuming and inconvenient and as such, it is desirable to have a more compact mounting assembly system which uses a minimum number of components of simple and inexpensive design and which are adaptable to several mounting schemes.

SUMMARY OF THE INVENTION

In one aspect of the invention there is provided a mount for a manually activated switch, the mount including a face plate having an aperture extending therethrough for mounting a switch actuator therein. A support member is provided on the rear face of the plate being integrally formed therewith. The support member includes a first portion surrounding the aperture and a second portion projecting outwardly from the plate. One of the first and second portions has a switch mounting means formed therein for mounting a switch to be engaged by a switch actuator mounted in the aperture.

In this aspect of the invention the second portion of the support member includes a raised portion which is integrally formed therewith.

In another aspect of the invention, a mount for mounting a combination actuating arm and switch assembly is provided which includes a face plate having an aperture extending therethrough for mounting a pivotally mounted actuating arm member. A support member is provided on the rear face of the plate being integrally formed therewith. The support member is provided with holding means for holding at least one actuatable switch, wherein the aperture and the holding means are in a predetermined relative orientation so that the actuatable switch may be actuated by moving the actuating arm member. There is provided means for securing the mount in a cut-out section of a wall or door.

In this aspect of the invention the mount includes a raised portion located on the rear face and integrally formed therewith, wherein the aperture extends through the raised portion.

Various embodiments of the invention will now be described, by way of example only, with reference to the accompanying drawings, in which:

BRIEF DESCRIPTION OF THE DRAWINGS

FIG. 1 is a perspective view of the mount of the present invention taken from the front of the mount;

FIG. 2 is a perspective view of the mount of FIG. 1 taken from the rear thereof;

FIG. 3 is a perspective view of another embodiment of the mount of the subject invention looking from the front;

FIG. 4 is a perspective view of the mount of FIG. 3 taken from the rear;

FIG. 5 is a perspective view of the mount of FIGS. 1 and 2 taken from the rear and having a switch mounted therein;

FIG. 6 is a perspective view of the mount of FIGS. 1 and 2 taken from the front and having a switch mounted therein;

FIG. 7 is an elevational side view of the mount containing switch of FIG. 5 with the switch in the open position;

FIG. 8 is the same as FIG. 7 but with the switch in the closed position;

FIG. 10 is the same switch mount as shown in FIG. 4 but wherein the mount contains a lock and switch;

FIG. 11 is the same as FIG. 10 but looking from the front; and

FIG. 12 is a side elevational view of the mount, lock and switch assembly shown in FIGS. 10 and 11.

DESCRIPTION OF THE PREFERRED EMBODIMENTS

Figure 9:
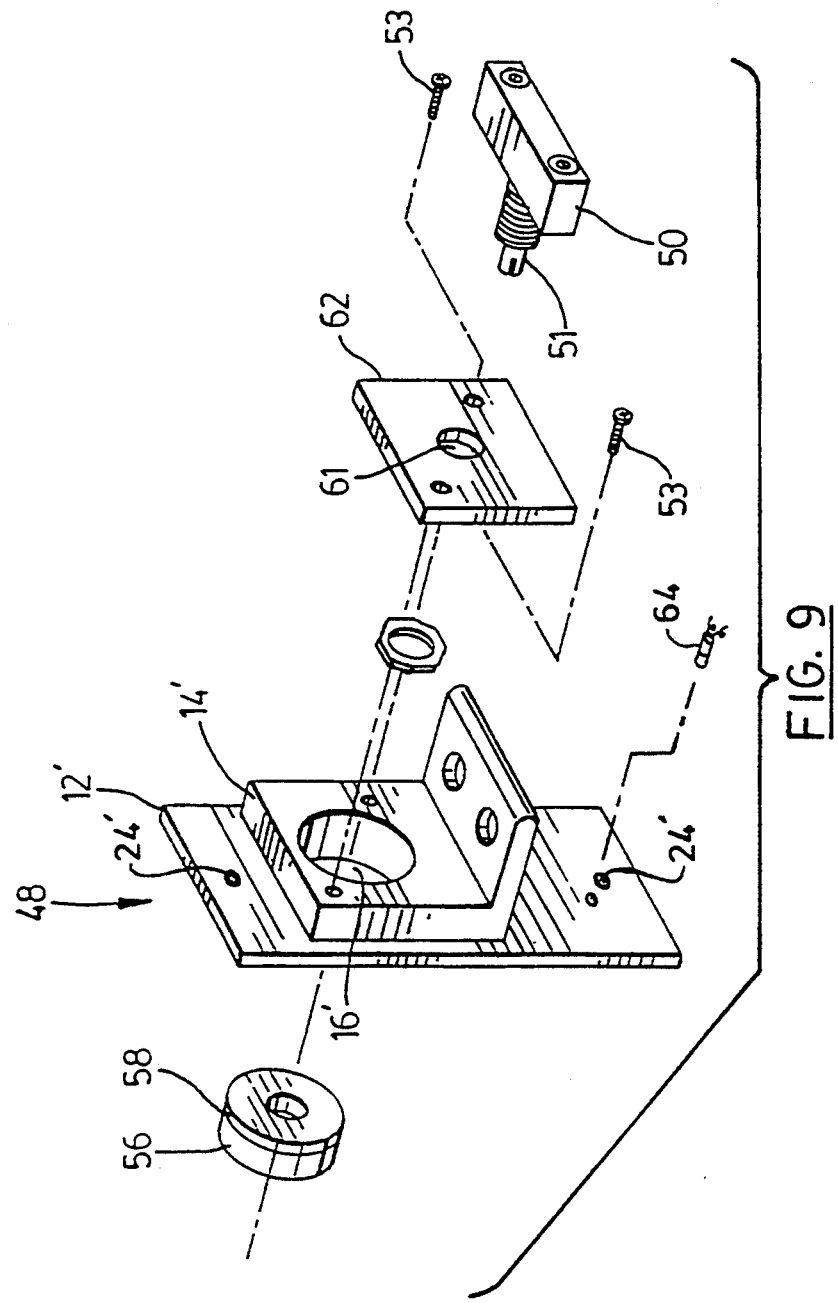
FIG. 9 is an exploded view of the switch and mount assembly of FIG. 5.

Preferred embodiments of the combination lock and switch mount and the use thereof will now be described with reference to the Figures wherein like numerals refer to like parts.

Referring to FIGS. 1 and 2, a switch mounting plate shown generally at 10 includes a face plate 12 shown here as being rectangular. Plate 12 is provided with a support member having a first raised portion 14 located on the rear face thereof and a second outwardly projecting portion 18 located along the bottom edge thereof, the support member being integrally formed with plate 12 at the time of fabrication. Raised portion 14 has a rearwardly facing switch mounting surface parallel to the rear face of plate 12.

Mount 10 is provided with a hole 16 through plate 12 and raised portion 14. Located on the circumference of hole 16 in mount 10 are two opposed projections 20 which protrude inwardly into hole 16. Preferably, projections 20 are integrally formed with mount 10 at the time of construction.

Mount 10 is preferably fabricated by known molding techniques whereby mount 10 may be fabricated with projections 20 formed therewith. Mount 10 may be cast from either metal or plastic as a solid piece.

As shown, member 18 is provided with a pair of holes 22, the purpose of which will become apparent presently. These holes shown at 22 may be drilled after mount 10 has been fabricated.

As seen in FIGS. 1 and 2, mount 10 may be provided with countersunk holes shown at 24 for use in securing mount 10 to a wall or frame as the case may be. Mount 10 is also shown provided with a pair of tapped holes at 26 and located in raised portion 14 for securing adaptor plates thereto as will be discussed presently.

Another embodiment of the switch mount of the subject invention is shown at 30 in FIGS. 3 and 4. Mount 30 is similar to that shown at 10 except for the following differences. Mount 30 includes a mounting bracket 32 located along and adjacent one edge of plate 12'. A slot 34 is located between bracket 32 and plate 12' which forms a receiving mouth for the edge portion of a wall, door or frame for mounting mount 30 thereto. Bracket 32 is preferably integrally formed with plate 12' at the time of construction. For example, bracket 32 may be formed initially as a raised portion wherein slot 34 can be machined out at a later time. Plate 12' is provided with a second aperture 36 located at the opposite end of plate 12' to bracket 32.

While the mounts shown at 10 and 30 are illustrated herein as being rectangular, it will be appreciated that they may be of any shape desirable depending on the application for which they are being used. Note that the raised portion 14 (14') need not necessarily be present, depending on the type and structure of the switch being mounted in aperture 16 (16').

Mounts 10 and 30 may be used for mounting various types of switches or combinations thereof. Various combinations will be discussed with reference to FIGS. 5-11

Referring first to the mount shown at 48 in FIGS. 5-9, an electrical push-button switch assembly is shown, generally at 50 mounted in aperture 16'. The mount used in this case is similar to that shown in FIGS. 1 and 2. Switch assembly 50 comprises a push button switch 51 located in an electrical contact containing box 52 having electrical lead connectors 54. Push button switch 51, see exploded view of FIG. 9, is mounted in orifice 16' and is provided with a plastic switch cap 56 which fits tightly over the push button. Cap 56 includes a ridge 58 so that when switch cap 56 is depressed to activate the switch, the switch is pushed in limited fixed distance in order to prevent wear and tear on the internal switch components. FIGS. 7 and 8 illustrate this wherein FIG. 7 shows the switch in the open position and FIG. 8 illustrates the switch fully depressed. Switch assembly 50 is mounted to mount 48 with the aid of an adaptor plate 62 bolted to raised portion 14' using threaded holes 26'. Adaptor plate 62 has a central aperture 61 concentric with aperture 16' through which button 51 protrudes. Plate 62 is secured to raised portion 14' using screws 53.

This embodiment of mount 48 may be provided with light emitting diode (LED) shown at 64 which may be wired to signal when switch 50 is on or off.

Referring now to FIGS. 10-12, a mount shown at 70, is similar to mount 30 of FIG. 4 has a known lock cylinder 72 mounted in aperture 16'. In this embodiment, lock cylinder 72 is provided with slots (not shown) which receive ribs 20', an outer threaded portion 74 and a retaining ring 76 for securing cylinder 72 within aperture 16'. Cylinder 72 is provided with key 78 insertable into a key slot which is accessible from the front of mount 70. Cylinder 72 includes a cam arm 82 pivotally mounted on the rear face thereof which is rotated by rotating key 78.

Mount 70 is shown having a known push button switch 84 mounted in support member 18'. Switch 84 includes an electrical contact housing 86 having a conventional plug 88. Aperture 16' and support member 18' are in a pre-determined orientation so that switch 84 and cam arm 82 are operably coupled. Thus, moving key 78 causes cam 82 to actuate switch 84.

It will be appreciated that another switch similar to switch 84 may be mounted in the other hole 22' which may then also be actuated by cam 82 by rotating key 78 in the opposite direction.

Mount 70 is provided with a locking bracket 90 pivotally mounted to a lock cylinder 92 mounted in aperture 36'. Bracket 90 is rotated by rotating a key (not shown) insertable from the front of mount 70. In this way, mount 70 may be mounted along an edge portion 94 in a cut-out section of a door, or wall and locked in place.

While the present invention has been described and illustrated with respect to the preferred and alternative embodiments, it will be appreciated that other embodiments of the switch mount may be readily made without departing from the scope or spirit of the invention, which is defined in the appended claims.

What is claimed is:

1. A mount for a manually activated switch, comprising:
    a) a face plate having a front face, a rear face and an aperture therethrough adapted for interchangeably mounting a switch actuator or a lock cylinder therein;
    b) a support member located on the rear face of the face plate, the support member being integrally formed with the face plate, the support member having a first portion and a second portion projecting outwardly from the face plate the first portion having a switch mounting surface parallel to said rear face capable of mounting a switch thereto in a first arrangement, said aperture passing through the first portion; and
    c) the second portion having switch mounting means formed therein adapted for alternatively mounting a switch to be engaged by one of said switch actuator and lock cylinder mounted in said aperture in a second arrangement.

2. A mount according to claim 1 wherein the support member first portion is a raised portion of the face plate.

3. A mount according to claim 2 wherein the support member second portion switch mounting means is means defining a hole offset relative to the aperture.

4. A mount according to claim 1 including mounting means for mounting said mount in accessible locations.

5. A mount according to claim 4 wherein the mounting means includes at least one hole extending through the plate at a location spaced from the aperture, and including at least one screw adapted to be inserted through said hole for securing said mount.

6. A mount according to claim 4 wherein the plate includes a bracket attached to the rear face thereof and adjacent a first edge of the plate, the bracket having a portion spaced from the plate for forming a gap therebetween, the gap suitable for receiving an edge portion of a wall therebetween, the plate further including a locking bracket pivotally mounted adjacent a second edge of the plate, the locking bracket operatively coupled to a lock, wherein the lock is accessible from the front of the plate.

7. A mount according to claim 6 wherein the mounting bracket is integrally formed with the plate.

8. A mount according to claim 1 further comprising a push button switch mounted in the aperture.

9. A mount according to claim 8 including an adaptor plate located between the switch and the mount.

10. A mount according to claim 8 wherein the push button switch is provided with a cap, the cap having a peripheral ridge adapted to engage the face plate, so that the cap may only be partially inserted into the aperture.

11. A mount as claimed in claim 1 and further comprising a push button switch mounted in the support member second portion.

12. A mount as claimed in claim 11 and further comprising a lock cylinder mounted in the aperture, the lock cylinder having a rotatable cam arm adapted to engage said push button switch.

13. A mount for a combination key activated lock and switch assembly comprising: a face plate having a front face, a rear face and a hole therethrough adapted for mounting an actuating arm member therein, the hole having a circumferential wall; the mount including at least one rib extending at least partially through the mount along said wall, the rib being integrally formed therewith, the rib extending partially into the hole, the rib being adapted to be received in a slot located in a peripheral edge of the activating arm member for preventing said activating arm member from rotating in the hole;

a) a support member located on the rear face of the face plate and extending rearwardly, the support member being integrally formed with the face plate, the support member provided with holding means for holding at least one mechanically actuatable switch member, wherein the hole and the holding means area in a predetermined relative orientation so that the mechanically actuatable switch member is actuated by moving the actuating arm member; and b) means for securing the mount in a wall.

14. A mount according to claim 13 wherein the securing means includes a first bracket attached to the rear face of said plate located adjacent a first edge of the plate, the bracket having a portion spaced from the plate for forming a gap therebetween, the gap suitable for receiving an edge portion of a wall therebetween, the plate further including a locking bracket pivotally mounted adjacent a second edge of the plate, the locking bracket operatively coupled to a lock, wherein the lock is accessible from the front of the plate.

15. A mount according to claim 14 wherein the first bracket and the pivotally mounted locking bracket are at opposed ends of the plate.

16. A mount according to claim 14 wherein the first bracket is integrally formed with the plate.

17. The mount according to claim 13 wherein the actuating arm member is a key activated lock cylinder provided with a cam member pivotally mounted on the rear face thereof, said lock cylinder mounted in the aperture so it may be activated by inserting a key therein from the front of the plate, said cam member undergoing pivotal motion by rotating said key, and wherein the mechanically actuatable switch member is a push button switch mounted in the support member holding means in such a way that said switch is actuated by movement of the cam member.

18. The mount according to claim 17 wherein the support member holding means is provided with two holes for holding two mechanically actuatable switches, and wherein one of said switches is actuated by pivoting the cam in one direction and wherein the other switch is actuated by pivoting the cam in the other direction.

19. A mount comprising: a face plate having a front face, a rear face and a hole therethrough adapted for mounting a switch actuator therein, the hole having a circumferential wall; the mount including at least one rib extending at least partially through the mount along said wall, the rib being integrally formed therewith, the rib extending partially into the hole, the rib being adapted to be received in a slot located in a peripheral edge of a switch mounted therein for preventing said switch from rotating in the hole;

a) a support member located on the rear face of the face plate, the support member being integrally formed with the face plate, the support member having a first portion surrounding said hole and a second portion projecting outwardly from the face plate; and b) one of the first and second portions having switch mounting means formed therein adapted for mounting a switch to be engaged by said switch actuator.

* * * * *